(12) United States Patent
Schlabach (10) Patent No.: US 6,367,337 B1
(45) Date of Patent: Apr. 9, 2002

(54) NON-CONTACTING SENSOR FOR MEASURING RELATIVE DISPLACEMENT BETWEEN TWO ROTATING SHAFTS

(75) Inventor: Rod A. Schlabach, Goshen, IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/564,313

(22) Filed: May 3, 2000

(51) Int. Cl.⁷ ............... G01L 3/10; G01B 7/30; B62D 5/04
(52) U.S. Cl. ............... 73/862.331; 324/207.2; 324/207.22; 324/207.25; 74/388 PS; 180/443
(58) Field of Search ............... 324/207.13–207.25; 33/1 PT; 73/862.325, 862.331–862.338; 180/443–446; 74/388 PS (56) References Cited

U.S. PATENT DOCUMENTS

| | | | |
|---|---|---|---|
| 4,530,413 A | * | 7/1985 | Buike et al. ............ 180/444 |
| 4,660,671 A | * | 4/1987 | Behr et al. ............ 180/446 |
| 4,724,710 A | * | 2/1988 | Murty ............ 324/207.13 X |
| 4,745,984 A | * | 5/1988 | Shimizu ............ 180/446 |
| 4,839,579 A | | 6/1989 | Ito et al. |
| 4,955,228 A | | 9/1990 | Hirose et al. |
| 4,984,474 A | * | 1/1991 | Matsushima et al. .. 324/207.25 X |
| 5,044,084 A | | 9/1991 | Pfeiffer et al. |
| 5,238,076 A | | 8/1993 | Aznar et al. |
| 5,248,939 A | | 9/1993 | Brauer |
| 5,309,758 A | | 5/1994 | Kubota et al. |
| 5,353,004 A | | 10/1994 | Takamoto et al. |
| 5,381,869 A | * | 1/1995 | Norton ............ 180/446 |
| 5,434,784 A | | 7/1995 | Bradley et al. |
| 5,595,089 A | * | 1/1997 | Watanabe et al. ....... 180/445 X |
| 5,818,038 A | | 10/1998 | Kerkmann et al. |
| 6,211,668 B1 | * | 4/2001 | Duesler et al. .......... 324/207.2 |

* cited by examiner

Primary Examiner—Gerard R. Strecker
(74) Attorney, Agent, or Firm—Mark P. Bourgeois; Mark W. Borgman (57) ABSTRACT

A sensor for measuring the relative displacement between two rotating shafts. The sensor can sense a torque applied to the steering wheel of a vehicle. The sensor has a housing that has apertures at each end. The rotating shafts pass into the housing. A sensor assembly is located in the housing and connected to the shafts. The sensor assembly generates an electrical signal that is proportional to the relative rotational displacement between the shafts. An electrical connector is located in the housing and electrically connects with the sensor assembly. The sensor assembly has a planetary gear assembly that is connected to the shafts. A variable magnetic field generator is connected to the planetary gear assembly and moves proportional to the relative rotational displacement of the shafts. A magnetic field sensor is located adjacent the variable magnetic field generator and generates the electrical signal as the variable magnetic field generator moves.

16 Claims, 5 Drawing Sheets

NON-CONTACTING SENSOR FOR MEASURING RELATIVE DISPLACEMENT BETWEEN TWO ROTATING SHAFTS

CROSS REFERENCE TO RELATED AND CO-PENDING APPLICATIONS

This application is related to the following U.S. patent applications: U.S. patent application Ser. No. 09/208,296, filed Dec. 9, 1998, now U.S. Pat. No. 6,211,668 B1 and titled, "Non-Contacting Position Sensor using Bipolar Tapered Magnets".

The foregoing patent has the same assignee as the instant application and is herein incorporated by reference in entirety for related and supportive teachings.

BACKGROUND OF THE INVENTION

1. Field of the Invention

This invention relates to sensors. In particular, there is a sensor that can measure the relative displacement between two rotating shafts. The sensor can be used to sense the amount of torque applied to a steering wheel in vehicle.

2. Description of the Related Art

Various devices and methods of dealing with the design of steering wheel sensors are known. Examples of patents related to the present invention are as follows, and each patent is herein incorporated by reference for the supporting teachings:

U.S. Pat. No. 5,353,004 is a sensor for detecting steering angle.

U.S. Pat. No. 5,818,038 is a steering wheel angular position sensor.

U.S. Pat. No. 5,434,784 is a vehicle steering wheel position sensing apparatus.

U.S. Pat. No. 5,248,939 is an apparatus for sensing the direction and speed of a steering wheel shaft using hall effect sensors in a detachable sensor mounting.

U.S. Pat. No. 5,044,084 is an angle sensor element.

U.S. Pat. No. 4,839,579 is a resistive steering sensor.

U.S. Pat. No. 5,309,758 is a steering angle sensor for automobile.

U.S. Pat. No. 4,955,228 is a device for detecting rotation of steering wheel for automobiles.

U.S. Pat. No. 5,238,076 is an electric power steering for parking.

The foregoing patents reflect the state of the art of which the applicant is aware and are tendered with the view toward discharging applicants' acknowledged duty of candor in disclosing information that may be pertinent in the examination of this application. It is respectfully stipulated, however, that none of these patents teach or render obvious, singly or when considered in combination, the applicant's claimed invention.

3 Problem with the Related Art

There are several problems occurring with the prior art. The prior art steering wheel sensors have sensed rotational position of the wheel. In particular, U.S. Pat. No. 5,353,004 discloses a device that mounts on the end of a steering wheel that measures two parameters. First, it measures where on a 360 degree turn the steering wheel is positioned. Second, it measures which turn the steering wheel is on. Typically, the steering wheel is rotated four turns, to turn the front wheels all the way from the left most position to the right most position. We will call the left most turn, turn 1 and the right most turn, turn four. The middle or straight position would be between turns 2 and 3. In other words, the wheel would have to rotate through 1440 degrees of rotation to complete four turns. The device of U.S. Pat. No. 5,353,004 does not measure torque applied between the steering wheel and the steering linkage.

More recently, efforts by the automotive industry have been focusing on electrical assist power steering for vehicles. The electrical assist power steering unit is an electrical motor attached to the steering linkage that operates when assist is required. A large amount of torque on the steering wheel occurs at low speed operation or during parking. The electrical assist power steering is generally not needed during high speed operation such as during highway driving. The major advantages of electrical assist power steering are first, that it only operates during the short time of turning and is inoperative the rest of the time and second that it is simpler to manufacture. In a hydraulic power steering system, the power steering pump is always being turned by the engine and represents an energy drain on the motor all the time even though steering is only performed during a small percentage of the total time a car is operated. An electrical assist power steering system requires sensing of torque applied to the steering wheel. The torque indicates how much force the operator is exerting to move the wheel. The output signal from a torque sensor is fed into a control unit which controls the electrical motor of the assist unit. When the torque sensed is high, the assist applied to the steering linkage will be high. When the torque sensed is low, the assist applied to the steering linkage will be low. Unfortunately, the current electrical assist power steering units tend to overshoot or overcompensate once it is activated. The operator will tend to have to counter compensate a small amount with the wheel during operation so that the wheel does not turn beyond the desired turning point. It is desirable to provide an advanced electrical assist power steering system with better operator ergonomics that feels the same during operation as the current hydraulic power steering systems. In order to accomplish this, the control unit needs precise torque information. With a precise torque sensor, the control unit can operate in various modes. For example, when the steering wheel rotation is reversed, the rotational position sensor can sense the reversal and the electric motor can be reversed before a large reverse torque is built up on the wheel and felt by the operator. This faster motor reversal leads to better operator ergonomics.

In general, a sensor that measures the relative displacement between two rotating shafts has useful applications in the areas of industrial machinery, aerospace, electrical power generation and transportation.

There is a current unmet need for precise steering wheel torque sensor that is readily manufacturable at low cost. Additionally, there is a current unmet need for a sensor to measure the relative displacement between two rotating shafts.

SUMMARY OF THE INVENTION

It is a feature of the invention to provide a sensor to measure the relative displacement between two rotating shafts.

It is a feature of the invention to provide a steering wheel sensor that can sense a torque applied to the steering wheel of a vehicle.

Yet, another feature of the invention is to provide a sensor for attachment between a first and second rotating shaft for measuring the relative displacement between the first and second rotating shafts. The sensor includes a housing that has apertures at each end. The first and second shafts pass into the housing. A sensor assembly is located in the housing and is connected to the first and second shafts to sense the relative rotational displacement of the first and second shafts. The sensor assembly generates an electrical signal. An electrical connector is located in the housing and electrically connects with the sensor assembly to provide the electrical signal to an external electrical circuit. The sensor assembly has a planetary gear assembly that is connected to the first and second shafts. A variable magnetic field generator is connected to the planetary gear assembly. The variable magnetic field generator moves proportional to the relative rotational displacement of the first and second shafts. A magnetic field sensor is located adjacent the variable magnetic field generator and is connected to the electrical connector for generating the electrical signal in response to rotational movement of the variable magnetic field generator. The planetary gear assembly has a housing and an upper carrier that is connected to the first shaft. A lower carrier is connected to the second shaft and is located adjacent the upper carrier. The upper and lower carriers are located within the housing. An upper set of planet gears is located on and rotatably supported by the upper carrier. A lower set of planet gears is located on and rotatably supported by the lower carrier. A sun gear is located within the upper and lower carriers between the upper and lower gears. The sun gear engages the upper and lower planet gears. An upper ring gear surrounds and engages the upper set of planet gears. A lower ring gear is attached to the housing. The lower ring gear surrounds and engages the planet gears. The upper ring gear moves proportional to the relative rotational displacement of the first and second shafts. The variable magnetic field generator has a tapered magnet that is located in a section of the upper ring gear. An aperture is located in the tapered magnet. The magnetic field sensor is located in the aperture. The magnetic field sensor is a hall effect sensor. The first shaft can be connected to a steering wheel and the second shaft can be connected to a vehicle steering linkage. The sensor is then operable to measure a torque applied to the steering wheel.

The invention resides not in any one of these features per se, but rather in the particular combination of all of them herein disclosed and claimed. Those skilled in the art will appreciate that the conception, upon which this disclosure is based, may readily be utilized as a basis for the designing of other structures, methods and systems for carrying out the several purposes of the present invention. Further, the abstract is neither intended to define the invention of the application, which is measured by the claims, neither is it intended to be limiting as to the scope of the invention in any way.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements between the drawings.

DETAILED DESCRIPTION OF THE PREFERRED EMBODIMENT

Figure 1:
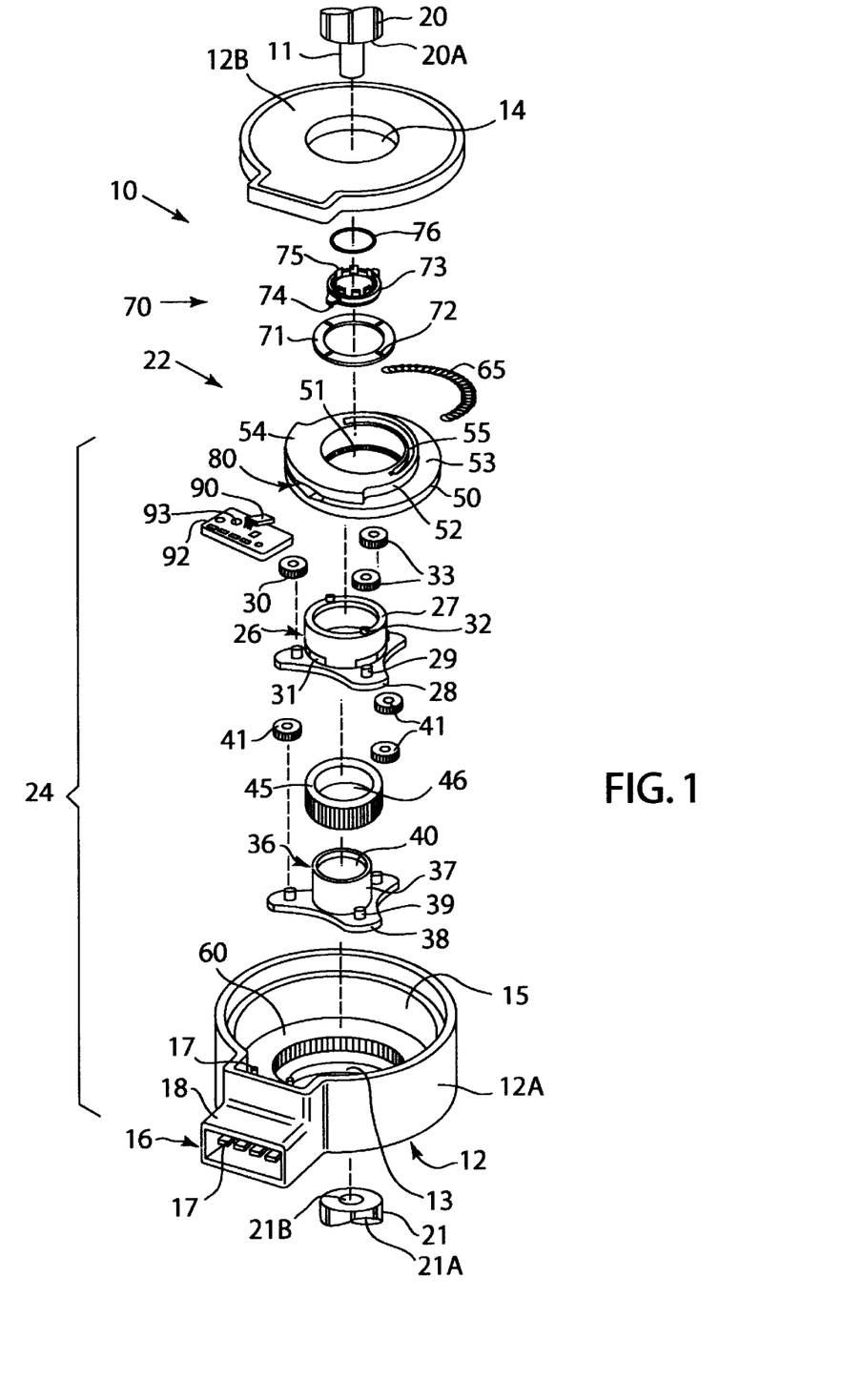
FIG. 1 is an exploded perspective view of the preferred embodiment of a non-contacting sensor for measuring the relative displacement between two rotating shafts.
Figure 2:
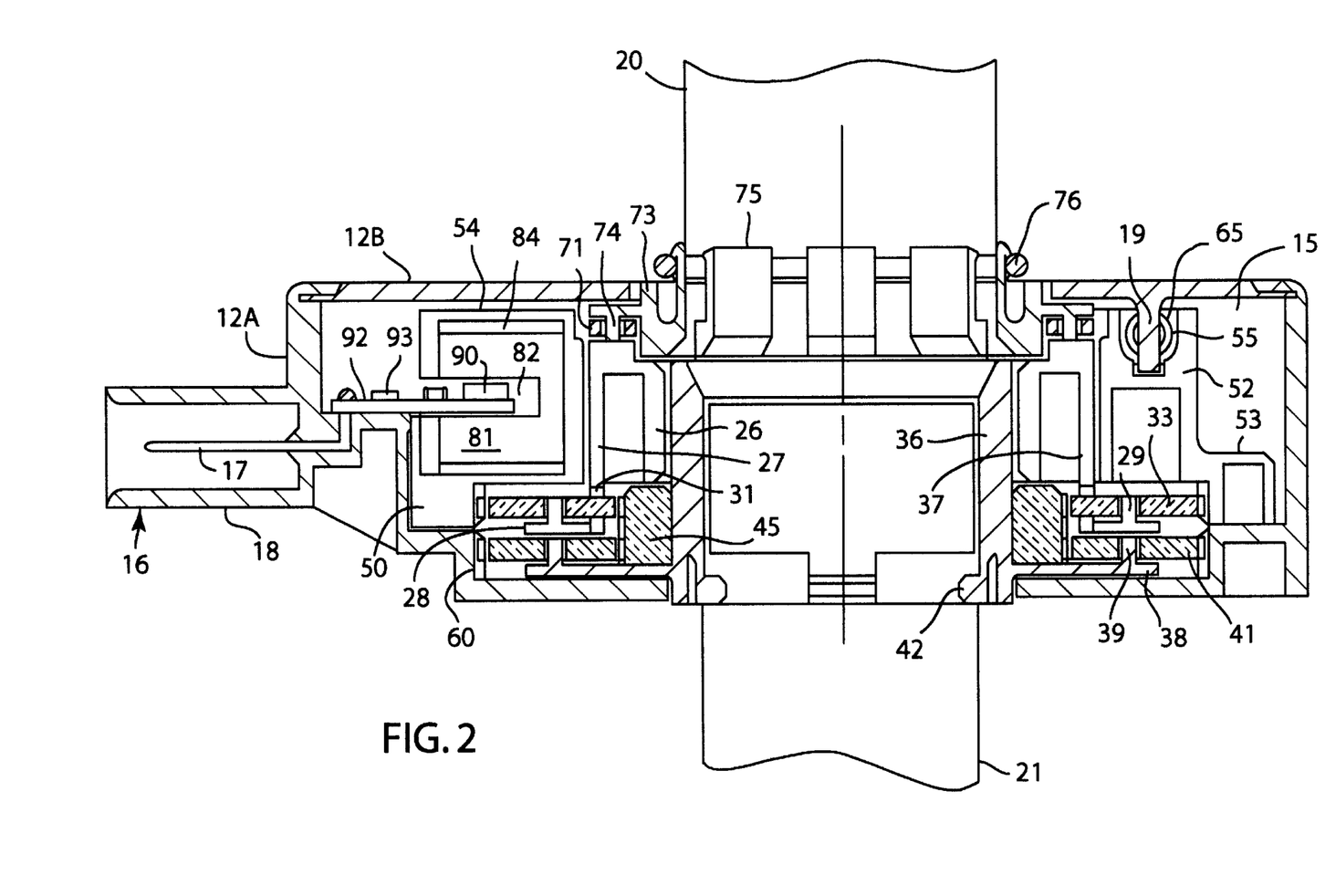
FIG. 2 is a cross sectional view of the sensor of FIG. 1 in an assembled state.
Figure 3:
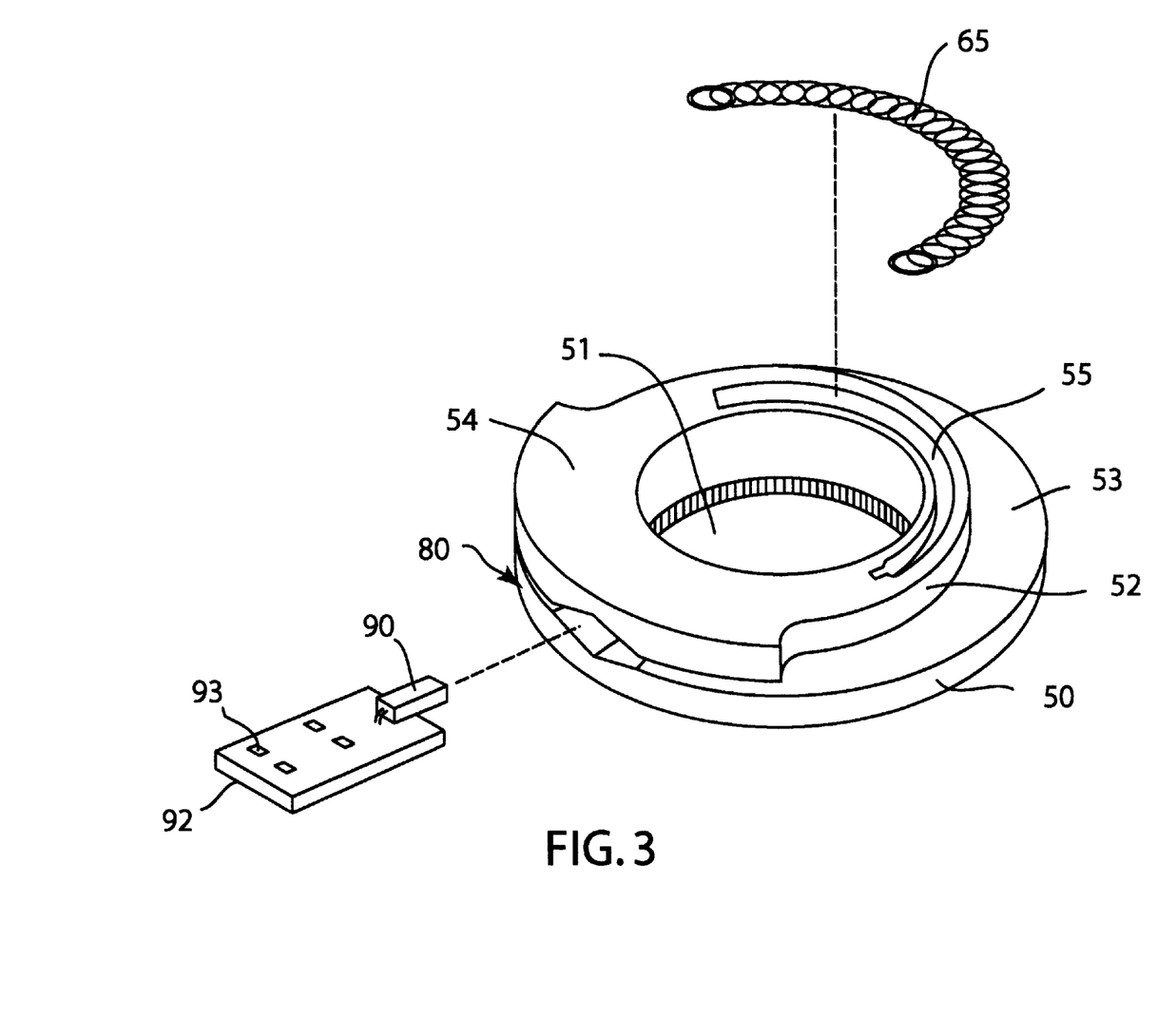
FIG. 3 is an enlarged perspective view of the upper ring gear.

Referring to FIGS. 1, 2 and 3 there is a sensor package 10 shown. In particular, sensor package 10 has a housing 12. Housing 12 has a bottom 12A and a top 12B. Housing bottom 12A has a connector 16 that provides an electrical connection from the inside of the housing to an external electrical circuit (not shown). Housing bottom 12A has an aperture 13 and housing top 12B has an aperture 14. Housing bottom 12A forms a cavity 15. The connector 16 has several terminals 17 that extend from outside the housing into cavity 15. A connector shroud 18 extends away from housing bottom 12A and is designed to mate with a conventional wiring harness (not shown). A projection 19 extends downwardly from housing top 12B. A pair of shafts 20 and 21 extend through apertures 13 and 14, respectively. Shafts 20 and 21 have splines 20A and 21A to mate with respective parts of the sensor package 10. In the center of shafts 20 and 21, a conventional torsion bar 11 is used to connect the shafts 20 and 21 together. Internal splines (not shown) or other fixing methods on shafts 20 and 21 would be used to connect with the torsion bar. Shaft 21 has a hole 21B that torsion bar 11 fits into. The torsion bar transmits the load between the two shafts and allows flexing or twisting to allow relative angular displacement of the shafts in proportion to the amount of torque placed on the shafts. In an automotive application, shaft 20 can be a steering wheel shaft that connects to a steering wheel and shaft 21 can be a steering linkage shaft that connects to a steering linkage gear box. The amount of difference in the relative rotational displacement of shaft 20 and 21 is proportional to the magnitude of torque being applied to the steering wheel.

A sensor assembly 22 is contained within housing 12. More specifically, sensor assembly 22 resides within cavity 15 and is sealed therein by housing top 12B. Sensor assembly 22 has a planetary gear assembly 24 that is connected to shafts 20 and 21, a variable magnetic field generator 80 and a magnetic field sensor 90. The magnetic field sensor 90 generates an electrical signal in response to rotational movement of the variable magnetic field generator 80.

The planetary gear assembly 24 has an upper carrier 26 connected to shaft 20 and a lower carrier 36 connected to shaft 21. The upper carrier 26 has a cylindrical barrel 27 with a bore 30 that passes through the barrel 27. Three arms 28 extend radially away from barrel 27. A post 29 extends upwardly from each of the arms 28. Three grooves 31 are located at the junction of arms 28 and barrel 27. Grooves 31 extend through barrel 27 into bore 30. A pair of fingers 32 extend upwardly from the top of barrel 27. Three planet gears 33 fit over and are rotatably supported by posts 29. Planet gears 33 extend through groove 31 and partially into bore 30.

The lower carrier 36 has a cylindrical barrel 37 with a bore 40 that passes through the barrel 37. Three arms 38 extend radially away from barrel 37. A post 39 extends upwardly from each of the arms 38. Three planet gears 41 fit over and are rotably supported by posts 39.

A sun gear 45 has a bore 46 extending therethrough. Sun gear 45 fits over barrel 37 and engages planet gears 41. The lower part of the sun gear is located between gears 41 and barrel 37. The sun gear 45 and the lower carrier 36 fit into the bottom of upper carrier 26. The upper part of the sun gear 45 engages planet gears 33. The planet gears 33 pass through groove 31 to engage sun gear 45. The upper carrier 26, lower carrier 36, sun gear 45 and planets 41 are assembled and placed into cavity 15. In cavity 15, planet gears 41 are engaged with lower ring gear 60. Lower ring gear 60 has teeth that face toward aperture 13 and is molded integrally as a part of housing 12. An upper ring gear 50 fits over and surrounds planet gears 33 in cavity 15. Ring gear 50 has a bore 51 passing therethrough. The teeth of ring gear 50 face toward bore 50 and are engaged with three planet gears 33. During operation, the upper ring gear 50 moves proportional to the relative rotational displacement of shafts 20 and 21, while the lower ring gear 60 and housing 12 remain stationary. A flange 52 extends upwardly from upper ring gear 50 forming a step 53. A fin 54 protrudes from flange 52 and extends circumferentially out to the diameter of ring gear 50 over approximately 120 degrees of the ring gear. A slot 55 is formed into the top of flange 52 opposite fin 54 and extends circumferentially over approximately 120 degrees of flange 52. A magnetic field generator 80 is located in fin 54. A coil spring 65 is located in slot 55. One end of spring 65 is adjacent to and in contact with projection 19 of housing 12. The other end of spring 65 is in contact with ring gear 50 at the end of slot 55. The spring biases ring gear 50 against planet gears 33 which rotate against sun gear 45 to remove play between the gears.

Figure 5:
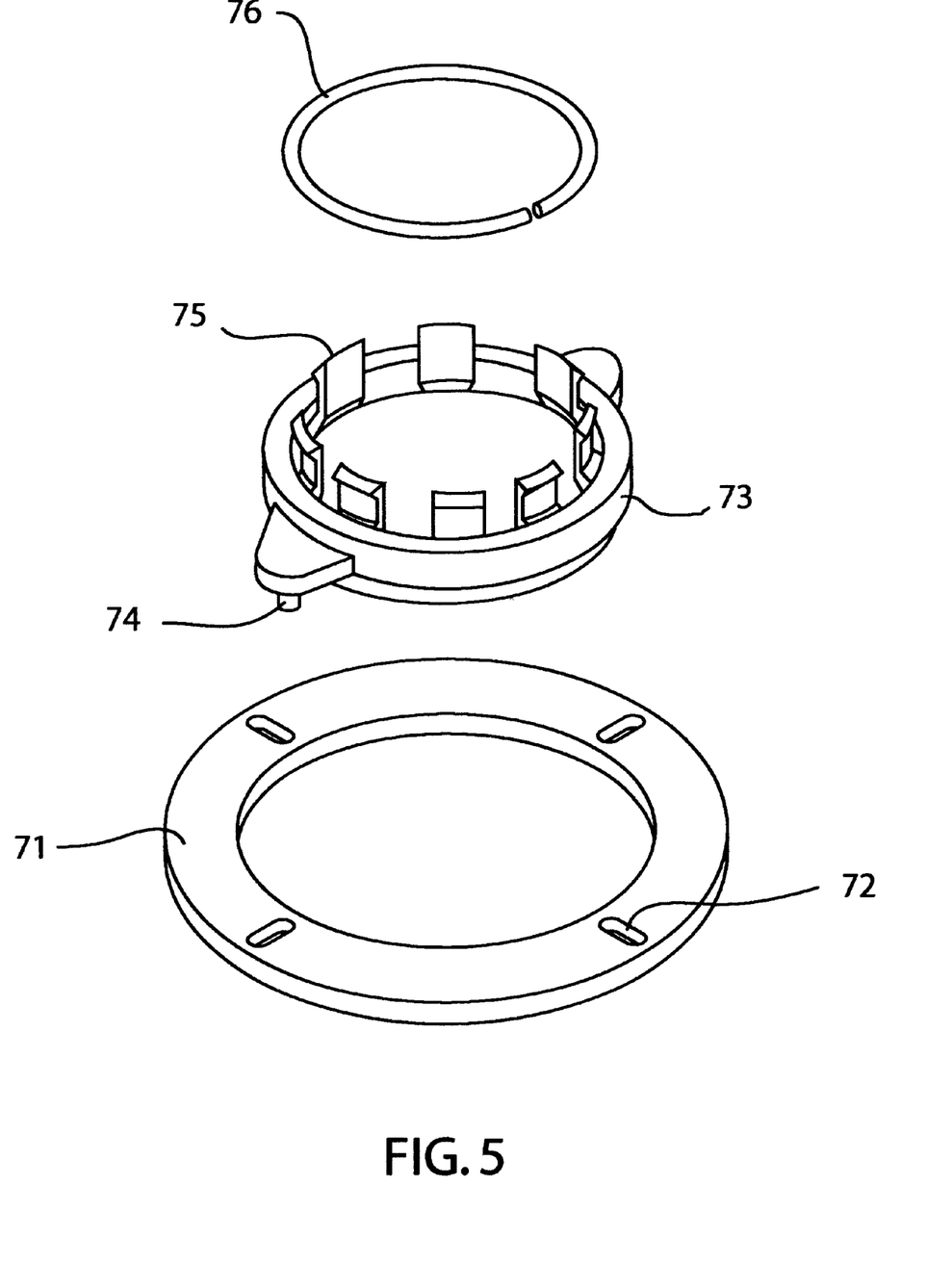
FIG. 5 is an enlarged perspective view of the concentricity compensator.

Referring to FIG. 5, details of concentricity compensator 70 are shown. Concentricity compensator 70 has a concentricity disc 71 with four slots 72. Disc 71 is supported by upper carrier 26. Two of the slots 72 fit over and are engaged with fingers 32 of upper carrier 26. A rotor 73 is located over disc 71. Rotor 73 has a pair of pins 74 extending downwardly into engagement with two of the slots 72. The rotor has tangs 75 extending upwardly. Tangs 75 engage splines 20A of shaft 21. A snap ring 76 surrounds tangs 75 and keeps tangs 75 pressed into splines 20A. The concentricity compensator 70 allows sensor 10 to rotate and perform properly when the axes of rotation of shafts 20 and 21 are not co-axial.

Figure 4:
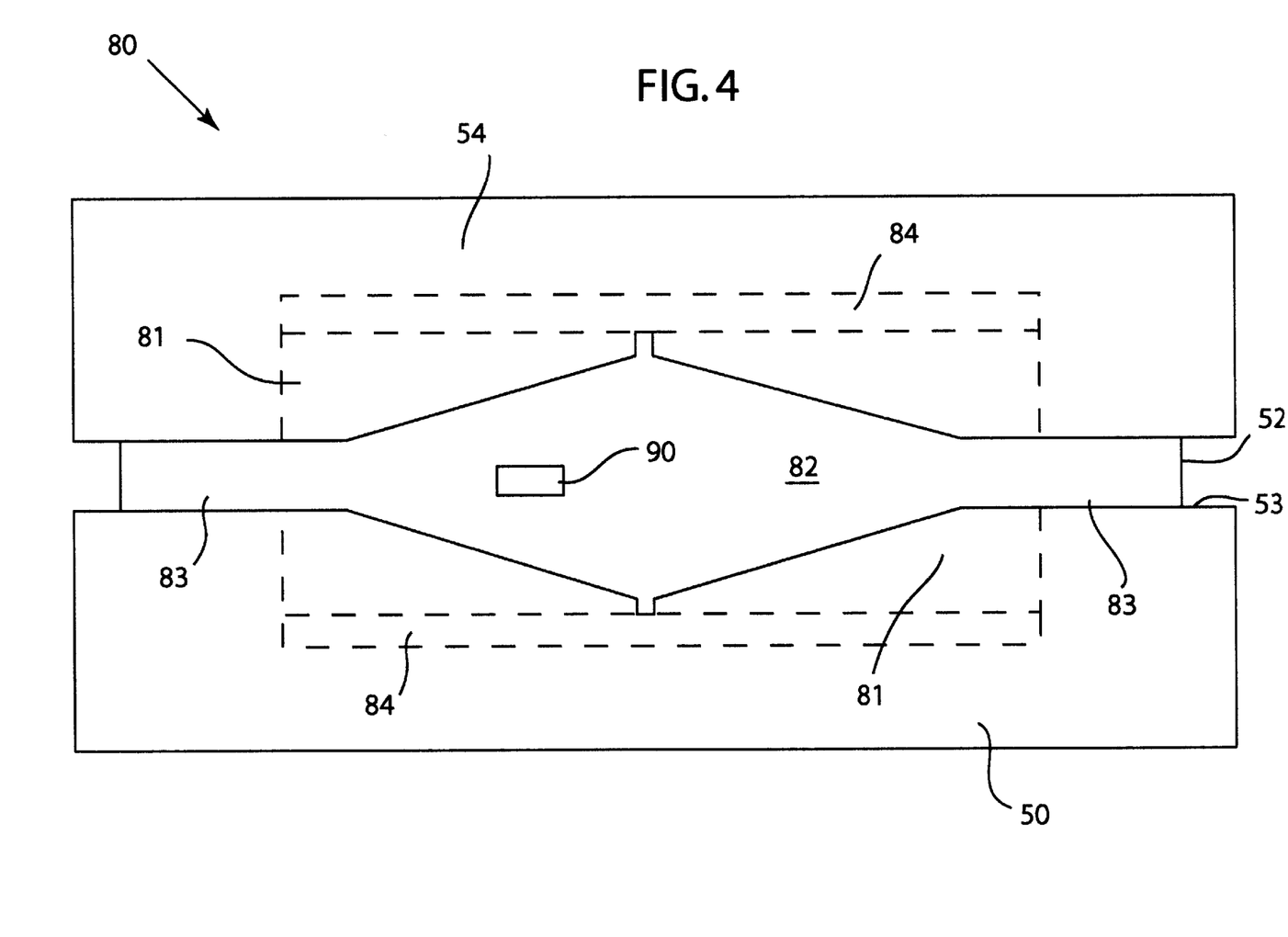
FIG. 4 is a side view of the upper ring gear looking at the bipolar tapered magnet.

Referring to FIG. 4, a magnetic field generator 80 is located in fin 54 and has a bipolar tapered magnet 81. Adjacent to each top and bottom surface of magnet 81 is a pole piece 84. Pole piece 84 is made of a magnetically permeable material to conduct a magnetic flux. A diamond shaped airgap 82 is formed in the bipolar tapered magnet 81. Rectangular airgaps 83 extend away on each side of airgap 82 between ring 50 and fin 54. A magnetic field sensor 90 is located in airgap 82 adjacent the bipolar tapered magnet 81. Magnetic field sensor 90 is a conventional hall effect sensor that generates an electrical signal in response to rotational position of the variable magnetic field generator 80.

Magnetic field sensor 90 is attached to circuit board 92. Circuit board 92 has several electronic components 93 located thereon. Components 93 are able to receive the electrical signal and modify the signal in a desired manner such as filtering or amplification. Alternatively, the magnetic sensor and the electronic components could be combined into one integrated circuit. The operation of magnetic field generator 80 and magnetic field sensor 90 is described in further detail in U.S. patent application Ser. No. 09/208,296, filed Dec. 9, 1998 and titled, "Non-Contacting Position Sensor using Bipolar Tapered Magnets". The foregoing patent is herein incorporated by reference in it's entirety as an additional disclosure of the instant invention.

Sensor 10 operates as follows: Shaft 20 is engaged with rotor 75 which is connected to upper carrier 26. Shaft 21 is engaged with lower carrier 36 through tabs 42. The upper and lower carriers are coupled to the ring gears 50 and 60 through sun gear 45 and planet gears 33 and 41. When shafts 20 and 21 rotate the same or rotate co-axial with each other, ring gear 50 does not move. However, when shafts 20 and 21 do not rotate co-axially or with the same rotational displacement, ring gear 50 moves rotationally relative to ring gear 60 proportional to the relative rotational displacement between shafts 20 and 21. As ring 50 moves, the bipolar magnet 81 also moves. The movement of bipolar magnet 81 is sensed by magnetic field sensor 90. Magnetic field sensor 90 generates an electrical signal that is proportional to the relative rotational displacement of shafts 20 and 21. The electrical circuitry 93 can condition the electrical signal before it is transmitted through terminals 17 to an external electrical circuit. In an automotive steering wheel application, the two shafts can be connected to a steering wheel and to a steering linkage. In this case, the electrical signal is proportional to the amount of torque placed on the steering wheel and can be useful to control an electric power assist steering system.

One of ordinary skill in the art of designing and using sensors will realize many advantages from studying and using the preferred embodiment. For example, the sensor is a non-contacting sensor that will not wear out with extended use. Further, the spring biases the gears such that increased accuracy is possible. Another advantage is that the housing can either rotate or be fixed and function properly provided that the ratio of the shaft to ring gear movement is 1:1. The invention provides a robust solution to the problem of sensing the differences in position between two rotating shafts.

VARIATIONS OF THE PREFERRED EMBODIMENT

Although the illustrated embodiment discusses the use of a non-contacting sensor, one skilled in the art will realize that the preferred embodiment would work with a contacting sensor. For example, it is contemplated to place a resistor element on fin 54 and to attach a wiper to the circuit board. Alternatively, the resistor could be placed on the circuit board and the wiper on fin 54. Additionally, an optical sensor could be used or a magnetic encoder.

Although the preferred embodiment showed the use of a planetary gear assembly, It is equivalent to use other types of gear arrangements. For example, ring and pinion, worm, helical or bevel gear assemblies could be used.

In a planetary gear system, the shafts 20 and 21 would not have to be connected to the carriers. They could be connected to separate suns or separate rings.

In the preferred embodiment, one particular combination of carriers, sun gears planets and ring gears were shown. Specifically, each of the carriers was attached to a shaft, the sun gear was common to the upper and lower ring gears and the bipolar magnet was attached to ring gear 50. Five other combinations are possible, they are:

1) Each shaft is connected to a separate sun gear, two ring gears and the bipolar magnet is connected to one of the ring gears.
2) Each shaft is connected to a separate sun gear, a common carrier, two ring gears and the bipolar magnet is connected to one of the ring gears.
3) Each shaft is connected to a separate carrier, a common ring gear, Two separate carriers and the bipolar magnet is connected to one of the carriers.

4) Each shaft is connected to a separate ring gear, a common carrier, two separate sun gears and the bipolar magnet is connected to one of the sun gears.

5) Each shaft is connected to a separate ring gear, a common sun gear, two separate carriers and the bipolar magnet is connected to one of the carriers.

Even though the use of sensor unit 20 was shown to detect the relative rotational displacement between two shafts in an automotive steering application. It is contemplated to use sensor unit 20 in any application that requires the detection of differential displacement of two or more objects moving in relative synchronization.

A second sensor assembly could be added to the sensor package 10 to measure the common rotational position of the shafts or which turn the steering wheel is on.

The planet gears were shown as round. It is possible for the planet gears to be elliptical shaped. For example, with corresponding variations in the profile of the ring gear and/or sun gear teeth an elliptical gear could be used.

Even though shafts 20 and 21 passed into the housing 12. It is contemplated to extend the carriers 26 and 36 outside of housing 12.

The embodiment shown used a coil spring 65. Other types of springs could be used such as a leaf spring.

If desired, sensor 10 can be configured to measure various magnitudes of relative rotational displacement by changing the gear ratios. For example, the sensor can be designed to measure the difference between the relative displacement of shaft 20 and twice the displacement of shaft 21.

The planet gears could have two concentric but axially-offset rows of teeth, with a different number and/or pitch of teeth, one set which rides against the ring, and one set which rides against the sun. This could be advantageous in getting desired ratios and/or fitting the planetary system into a given package.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the description. All changes that come within the meaning and range of equivalency of the claims are to be embraced within their scope.

What is claimed is:

1. A sensor for attachment between a first and second rotating shaft for measuring the relative displacement between the first and second rotating shaft, comprising:
    a) a housing having a first and second aperture at each end thereof, the first shaft extending through the first aperture into the housing and the second shaft extending through the second aperture into the housing, the shafts each having an end that is located adjacent each other in the housing such that the shafts are co-axial to each other;
    b) a planetary gear assembly connected to the first and second shafts, the planetary gear assembly having a first ring gear connected to the first shaft and a second ring gear connected to the housing, the first and second shafts when rotating in a non-coaxial manner causing the first ring gear to change an angular position relative to the second ring gear.
    c) a variable magnetic field generator connected to the planetary gear assembly, the variable magnetic field generator moving proportional to the relative angular change between the first ring gear and the second ring gear;
    d) a magnetic field sensor located adjacent the variable magnetic field generator and connected to the housing, the magnetic field sensor generating an electrical signal in response to rotational movement of the variable magnetic field generator; and
    e) an electrical connector, located in the housing and electrically connected to the magnetic field sensor for providing the electrical signal to an external electrical circuit.

2. The sensor according to claim 1, wherein the planetary gear assembly further comprises:
    a) a housing;
    b) an upper carrier connected to the first shaft;
    c) a lower carrier connected to the second shaft and located adjacent the upper carrier, the upper and lower carriers located within the housing;
    d) an upper set of planet gears located on and rotatably supported by the upper carrier;
    e) a lower set of planet gears located on and rotatably supported by the lower carrier;
    f) a sun gear located within the upper and lower carriers between the upper and lower gears, the sun gear engaging the upper and lower planet gears;
    g) the upper ring gear surrounding and engaging the upper set of planet gears; and
    h) the lower ring gear attached to the housing, surrounding and engaging the planet gears, the upper ring gear moving proportional to the relative rotational displacement of the first and second shafts.

3. The sensor according to claim 2, wherein the variable magnetic field generator further comprises:
    a) a tapered magnet located in a section of the upper ring gear;
    b) an aperture in the tapered magnet, the magnetic field sensor located in the aperture.

4. The sensor according to claim 3, wherein the magnetic field sensor is a hall effect sensor.

5. The sensor according to claim 4, wherein the tapered magnet is a bipolar tapered magnet.

6. The sensor according to claim 2, wherein the upper ring gear has a slot disposed in a radial surface.

7. The sensor according to claim 6, wherein a spring is disposed in the slot, the spring engaging a projection of the housing such that the spring biases the planetary gear assembly to remove play between the gears.

8. The sensor according to claim 1, wherein the first shaft is connected to a steering wheel and the second shaft is connected to a vehicle steering linkage, the sensor operable to measure a torque applied to the steering wheel.

9. A torque sensor for attachment between a first and second steering column shaft of a vehicle, the first shaft connected to a steering wheel and the second shaft connected to a vehicle steering linkage, a torsion spring bar connected between the first and second shafts allowing rotational movement between the first and second shafts, comprising:
    (a) a housing having a first and second aperture at each end thereof, the first shaft extending through the first aperture into the housing and the second shaft extending through the second aperture into the housing, the shafts each having an end that is located adjacent each other in the housing such that the shafts are co-axial to each other;

(b) a planetary gear assembly connected to the first and second shafts, the planetary gear assembly having a first ring gear connected to the first shaft, a second ring gear connected to the housing, a first planet gear engaged between the sun gear and the first ring gear and a second planet gear engaged between the sun gear and the second ring gear, the first and second shafts when rotating in a non-coaxial manner causing the first ring gear to change an angular position relative to the second ring gear (c) a variable magnetic field generator connected to the first ring gear, the variable magnetic field generator moving proportional to the relative angular change between the first ring gear and the second ring gear; and (d) a magnetic field sensor located adjacent the variable magnetic field generator and connected to the housing, the magnetic field sensor generating an electrical signal in response to rotational movement of the variable magnetic field generator, the electrical signal being proportional to the difference in angular positions of the first and second shafts which is indicative of the amount of torque being applied to the first and second shafts.

10. The torque sensor according to claim 9, wherein an electrical connector is located in the housing and electrically connected to the magnetic field sensor for providing the electrical signal to an external electrical circuit.

11. The torque sensor according to claim 9, wherein the planetary gear assembly further comprises:

a) an upper carrier connected to the first shaft b) a lower carrier connected to the second shaft and located adjacent the upper carrier;

c) the first planet gear located on and rotatably supported by the upper carrier;

d) the second planet gear located on and rotatably supported by the lower carrier; and e) the sun gear located within the upper and lower carriers between the planet gears.

12. The torque sensor according to claim 9, wherein the variable magnetic field generator further comprises:

a) a tapered magnet located in a section of the upper ring gear; and b) an aperture in the tapered magnet, the magnetic field sensor located in the aperture.

13. The sensor according to claim 9, wherein the magnetic field sensor is a hall effect sensor attached to a circuit board, the circuit board containing signal conditioning circuitry to modify the electrical signal.

14. The sensor according to claim 12, wherein the tapered magnet is a bipolar tapered magnet.

15. The sensor according to claim 9, wherein the upper ring gear has a slot disposed in a radial surface thereof.

16. The sensor according to claim 15, wherein a spring is disposed in the slot, the spring engaging a projection of the housing such that the spring biases the planetary gear assembly to remove play between the gears.

* * * * *